(12) United States Patent
Hyeon et al.

(10) Patent No.: US 7,941,119 B2
(45) Date of Patent: May 10, 2011

(54) SIGNAL PROCESSING METHOD AND APPARATUS IN DIGITAL BROADCASTING APPARATUS OF WIRELESS TERMINAL

(75) Inventors: Byeong-Bae Hyeon, Daejeon (KR); Byul Hur, Uijeongbu-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 729 days.

(21) Appl. No.: 11/872,162

(22) Filed: Oct. 15, 2007

(65) Prior Publication Data

US 2008/0106648 A1 May 8, 2008

(30) Foreign Application Priority Data

Nov. 3, 2006 (KR) .................. 10-2006-0108415
Jul. 25, 2007 (KR) .................. 10-2007-0074554

(51) Int. Cl.
*H04B 1/10* (2006.01)

(52) U.S. Cl. ............ 455/307; 455/333; 455/188.1; 455/179.1; 455/325; 455/339; 348/725

(58) Field of Classification Search ............ 455/307, 455/333, 188.1, 179.1, 315, 339; 348/725
See application file for complete search history.

(56) References Cited

U.S. PATENT DOCUMENTS

| 7,058,368 B2* | 6/2006 | Nicholls et al. ............ 455/114.2 |
| 7,079,195 B1* | 7/2006 | Birleson et al. ............ 348/725 |
| 7,187,913 B1* | 3/2007 | Rahn et al. ............ 455/188.1 |
| 7,545,889 B2* | 6/2009 | Li et al. ............ 375/332 |

* cited by examiner

*Primary Examiner* — Sanh D Phu
(74) *Attorney, Agent, or Firm* — Jefferson IP Law, LLP

(57) ABSTRACT

An apparatus and method for processing a digital broadcast signal are provided. The method includes cutting off a noise frequency of a received digital broadcast signal and low-noise amplifying the noise cut-off signal, limiting an amplitude of the low-noise amplified signal spectrum to an amplitude of the digital broadcast signal spectrum, and cutting off a noise frequency of the amplitude limited signal spectrum and passing only a signal corresponding to a frequency band of the digital broadcast signal.

12 Claims, 8 Drawing Sheets

SIGNAL PROCESSING METHOD AND APPARATUS IN DIGITAL BROADCASTING APPARATUS OF WIRELESS TERMINAL

PRIORITY

This application claims the benefit under 35 U.S.C. §119(a) of a Korean patent application filed in the Korean Intellectual Property Office on Nov. 3, 2006 and assigned Serial No. 2006-108415 and of a Korean patent application filed in the Korean Intellectual Property Office on Jul. 25, 2007, and assigned Serial No. 2007-74554, the entire disclosures of both of which are hereby incorporated by reference.

BACKGROUND OF THE INVENTION

1. Field of the Invention

The present invention relates generally to the processing of a digital broadcast signal. More particularly, the present invention relates to an apparatus and method for reducing signal interference in a digital broadcasting apparatus of a wireless terminal.

2. Description of the Related Art

As the mobile communication environment develops, wireless terminals, which previously only provided service for voice calls, are gradually being provided with various additional features. For example, a user may perform video communication with another user in real-time using a wireless terminal equipped with a camera. Additionally, a user may view the contents of a digital broadcasting signal using a wireless terminal equipped with digital broadcasting apparatus, such as a Digital Multimedia Broadcasting (DMB) apparatus, a Digital Video Broadcasting-Handheld (DVB-H) apparatus, or a media Forward Link Only (FLO) apparatus. Recently, wireless terminals that have a general digital broadcasting function are being provided, wherein a representative digital broadcasting is DMB and DVB-H. However, a DVB-H broadcast signal (Ultra High Frequency (UHF) signal) has a frequency band adjacent to that of a Global System for Mobile Communications (GSM) or Personal Communications Service (PCS) signal. Also, a DVB-H broadcast signal has very low signal intensity as compared to a GSM or PCS signal. For example, the frequency band (470 MHz-862 MHz: C21-C69) of the DVB-H broadcast signal is adjacent to 900 MHz, which is the frequency band of a GSM signal. Furthermore, the signal power of the DVB-H broadcast signal is lower than that of the GSM signal, resulting in difficulty in receiving a digital broadcasting signal. In conventional approaches, high performance notch filter or other various filter combinations are used to solve the adjacent higher power noise (e.g., GSM signal) problem of the DVB-H broadcast signal. However, they require complex configurations which in turn create a size and/or cost problem in a wireless terminal. Thus, there is a need for a method and apparatus for processing a digital broadcast signal, whereby interference due to an adjacent frequency band can be minimized with only a simple filter configuration.

SUMMARY OF THE INVENTION

An aspect of the present invention is to address at least the above problems and/or disadvantages and to provide at least the advantages described below. Accordingly, an aspect of the present invention is to provide a method and apparatus for minimizing the intensity of a GSM signal (noise signal) adjacent to a DVB-H broadcast signal by limiting a peak spectrum of the noise signal to a predetermined level instead of a conventional method of suppressing a noise signal (interference signal), which is adjacent to a broadcast signal and has relatively high signal intensity, using a high-performance notch filter configuration.

According to one aspect of the present invention, a signal processing method is provided. The method includes low-noise amplifying a received digital broadcast signal, limiting a peak spectrum of the low-noise amplified signal to a spectral amplitude of the received signal, cutting off a noise frequency of the limited signal and passing a signal corresponding to a frequency band of the received signal.

According to another aspect of the present invention, a signal processing apparatus in a digital broadcasting apparatus of a wireless terminal is provided. The apparatus includes a Surface Acoustic Wave (SAW) filter for filtering a noise frequency of a received digital broadcast signal, a Low Noise Amplifier (LNA) for low-noise amplifying the signal filtered by the SAW filter, a peak spectrum limiter for limiting an amplitude of the spectrum of the low-noise amplified signal to a certain level, a notch filter for cutting off a noise frequency of the amplitude limited signal, and a Band Pass Filter (BPF) for passing a signal corresponding to a frequency band of the received signal from the signal filtered by the notch filter.

BRIEF DESCRIPTION OF THE DRAWINGS

The above and other aspects, features and advantages of certain exemplary embodiments of the present invention will become more apparent from the following detailed description when taken in conjunction with the accompanying drawing in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In the following description, well-known functions or constructions are omitted for clarity and conciseness.

Figure 1A:
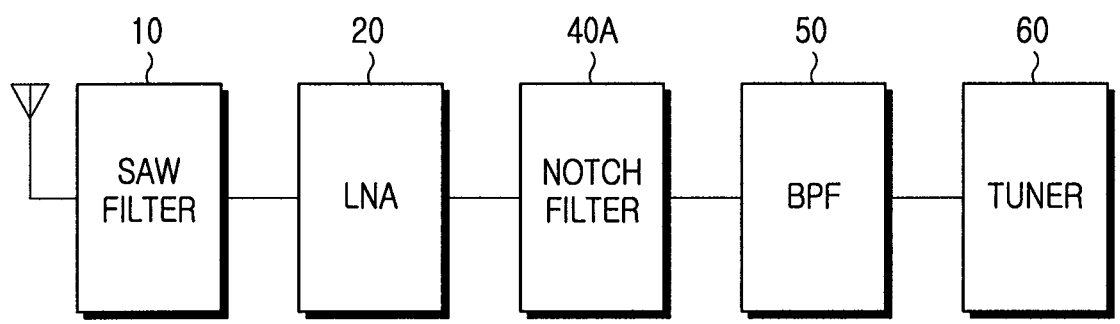
FIG. 1A is a schematic block diagram illustrating a conventional digital broadcasting apparatus.

FIG. 1A is a schematic block diagram illustrating a conventional digital broadcasting apparatus.

Referring to FIG. 1A, the conventional digital broadcasting apparatus includes a Surface Acoustic Wave (SAW) filter 10, a Low Noise Amplifier (LNA) 20, a notch filter 40A, a Band Pass Filter (BPF) 50 and a tuner 60. The SAW filter 10 is used for passing a specific frequency. Such a SAW filter is mainly used in wireless devices, such as a wireless terminal, due to its sharp skirt characteristic. The LNA 20 is an amplifier for amplifying a signal weakened in a transmission path. The LNA 20 suppresses noise included in a signal and amplifies an original signal. The notch filter 40A is for cutting off a specific frequency and is mainly used to cancel an unnecessary frequency. The notch filter 40A has a complex filter configuration in order to cancel an interference signal (e.g., Global System for Mobile Communications (GSM) signal) against a Digital Video Broadcasting-Handheld (DVB-H) broadcast signal. The BPF 50 passes only a necessary frequency band. The tuner 60 acquires a desired frequency band by tuning a signal frequency band.

Figure 1B:
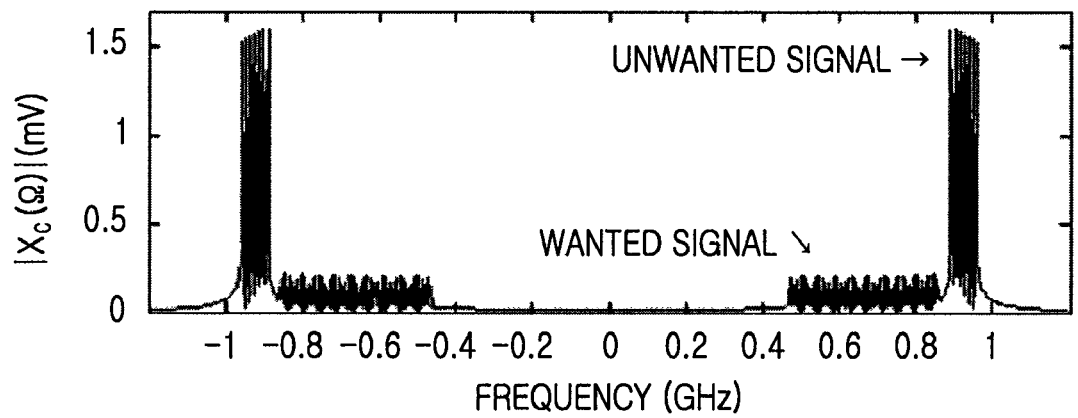
FIG. 1B illustrates a frequency spectrum of a digital broadcast signal processed by a conventional digital broadcasting apparatus.

FIG. 1B illustrates the frequency spectrum of a digital broadcast signal processed by a conventional digital broadcasting apparatus. In particular, FIG. 1B illustrates the frequency spectrum of a digital broadcast signal processed by the SAW filter 10 and the LNA 20 illustrated in FIG. 1A. More specifically, FIG. 1B shows a DVB-H broadcast signal, which is a type of digital broadcast signal and a GSM signal. As illustrated in FIG. 1B, a frequency band of the DVB-H broadcast signal (desired signal) is adjacent to that of the GSM signal (undesired signal). As further illustrated, the undesired GSM signal has greater signal power than the desired DVB-H broadcast signal and occupies a frequency band adjacent to that of the DVB-H broadcast signal. As such, the undesired GSM signal may cause interference with the desired DVB-H broadcast signal.

Figure 1C:
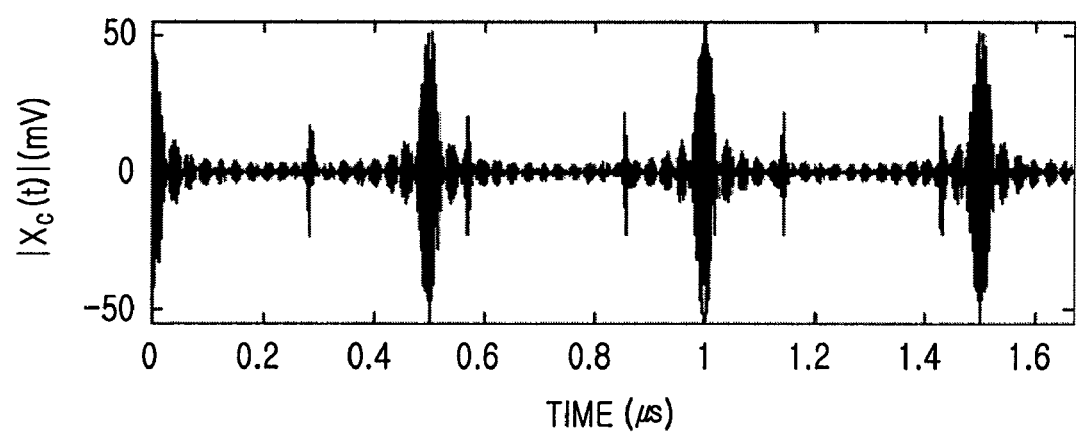
FIG. 1C illustrates a waveform of the digital broadcast signal illustrated in FIG. 1B.

FIG. 1C illustrates a waveform of the digital broadcast signal illustrated in FIG. 1B. In particular, FIG. 1C illustrates a frequency waveform of the digital broadcast signal processed by the SAW filter 10 and the LNA 20 illustrated in FIG. 1A.

The digital broadcast signal (DVB-H broadcast signal) processed by the conventional digital broadcasting apparatus illustrated in FIG. 1A will now be described with reference to FIGS. 1B and 1C. A specific frequency of the digital broadcast signal illustrated in FIG. 1B (e.g., a frequency including the digital broadcast signal) is passed by the SAW filter 10 and is low-noise amplified by the LNA 20. A noise frequency of the low-noise amplified signal is then cut off by the notch filter 40, and a signal corresponding to a digital broadcast frequency band is passed by the BPF 50. As illustrated in FIGS. 1B and 1C, the signal contains noise due to relatively greater power of an interference signal (e.g., a GSM signal) at the input of the notch filter 40A. In order to minimize this influence of the interference signal, the conventional digital broadcasting apparatus needs the high-performance notch filter 40A or a set of several filters. However, a high-performance notch filter requires a very sharp skirt characteristic and a high suppression characteristic, and it is difficult to implement the high-performance notch filter. In general, since a suppression level of a desired signal (e.g., digital broadcast signal) increases when the suppression characteristic of a notch filter is increased in order to minimize noise due to an interference signal, a suppression level of an actual notch filter is determined within a certain level. Thus, even if a high performance notch filter is used, the conventional digital broadcasting apparatus is not sufficient to minimize interference due to noise when the amplitude of the noise adjacent to a desired signal is great.

Figure 2A:
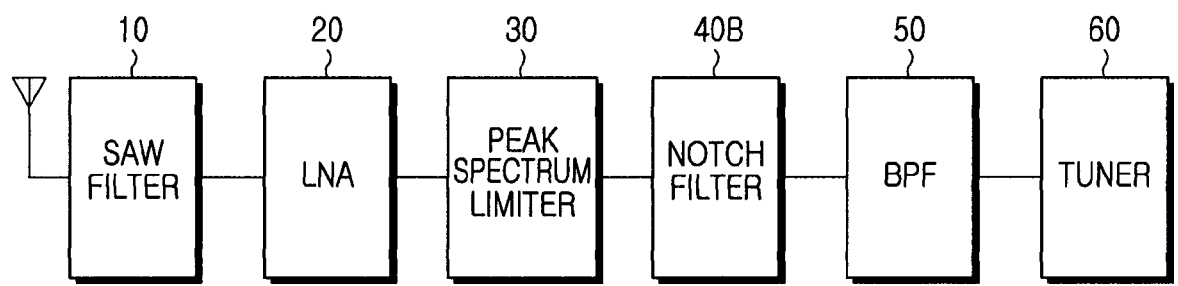
FIG. 2A is a schematic block diagram illustrating a digital broadcasting apparatus according to an exemplary embodiment of the present invention.
Figure 2B:
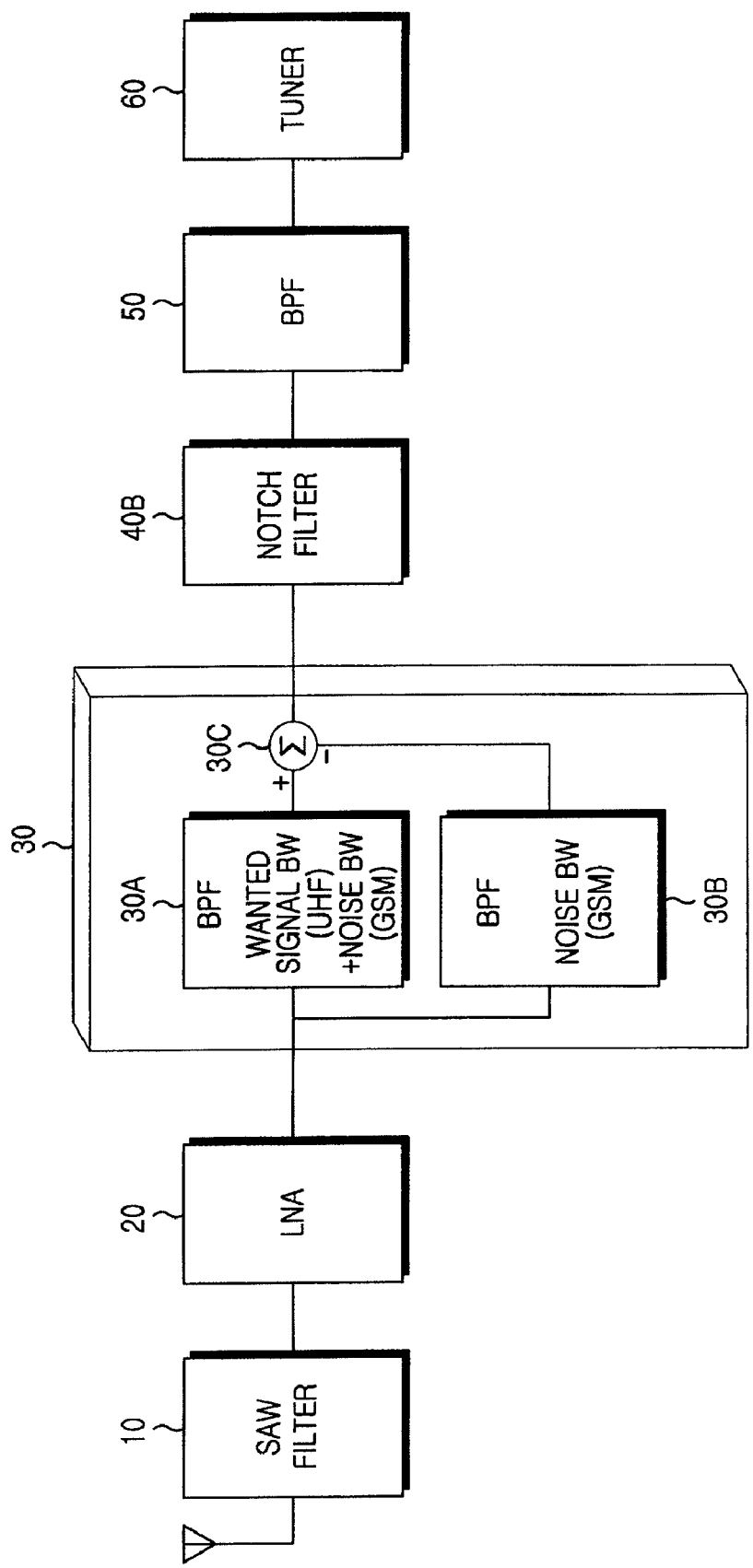
FIG. 2B is a detail block diagram illustrating a digital broadcasting apparatus according to an exemplary embodiment of the present invention.
Figure 2C:
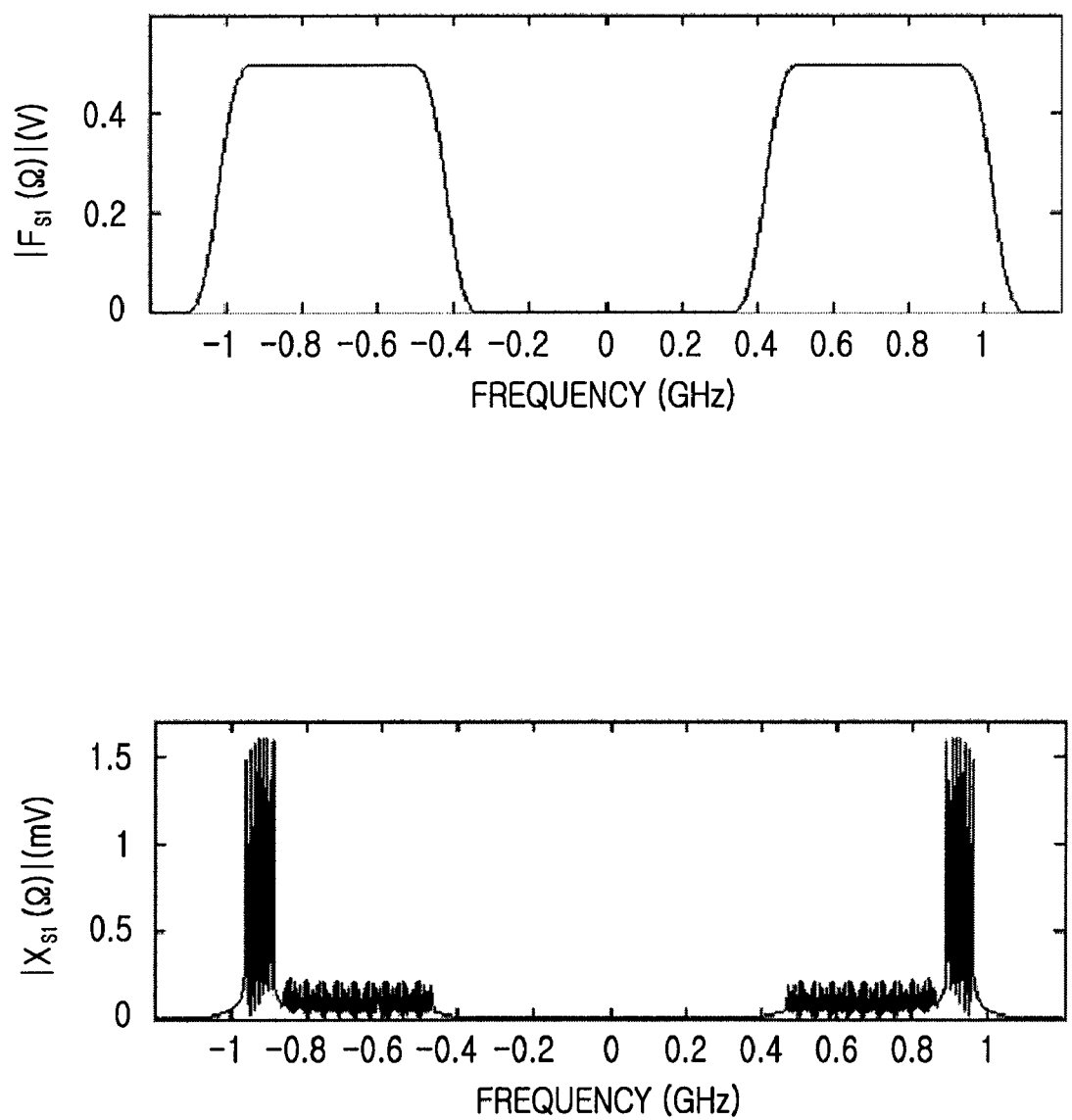
FIGS. 2C and 2D illustrate characteristics of a peak spectrum limiter according to an exemplary embodiment of the present invention.
Figure 2D:
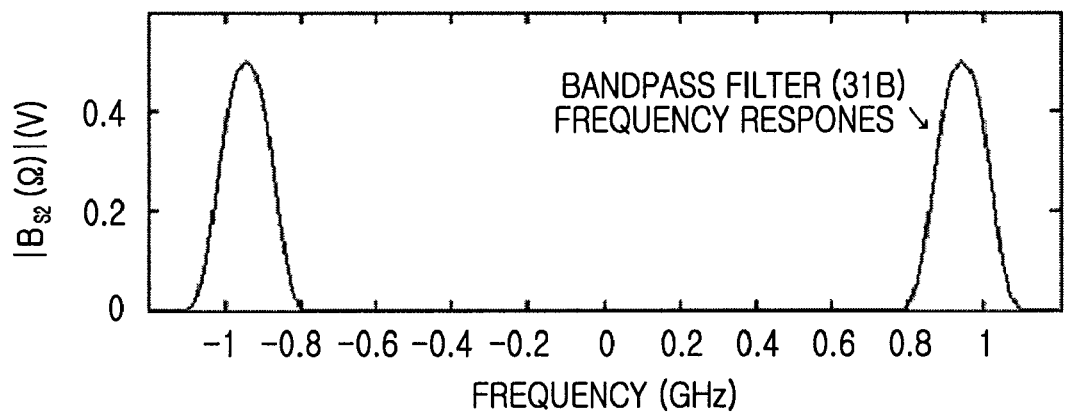
Figure 2D:
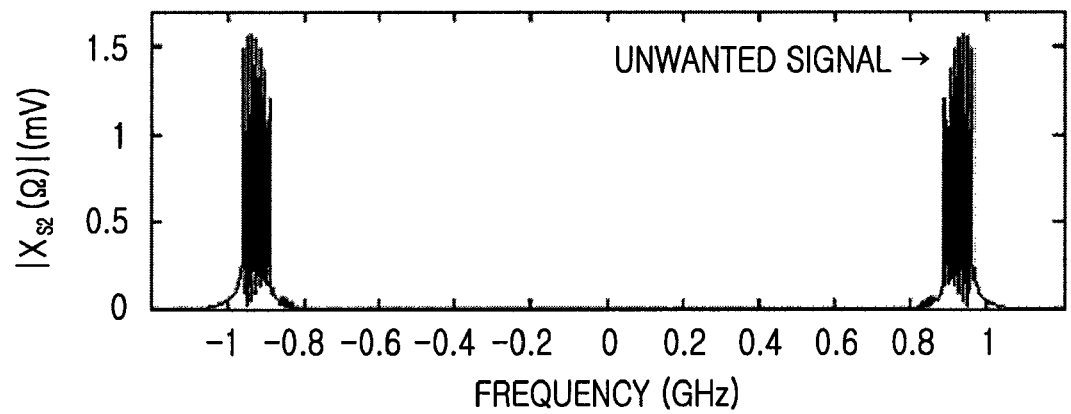
Figure 2E:
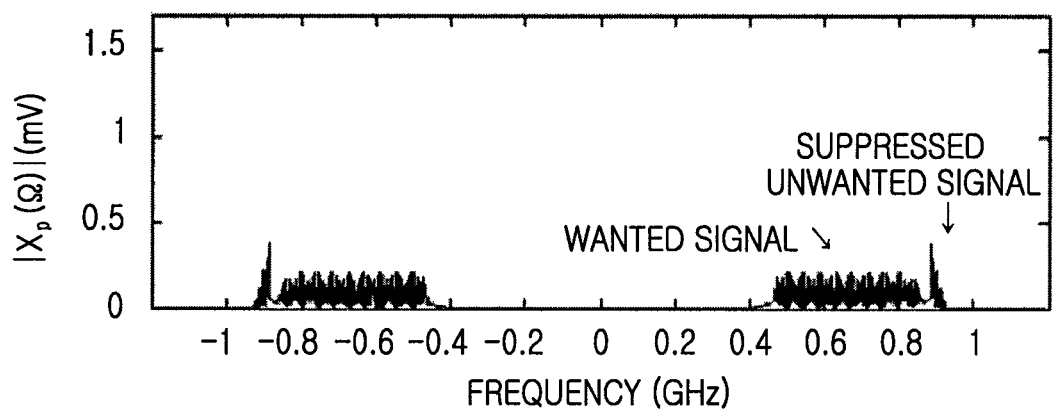
FIGS. 2E and 2F illustrate digital broadcast signals processed by a digital broadcasting apparatus according to an exemplary embodiment of the present invention.
Figure 2F:
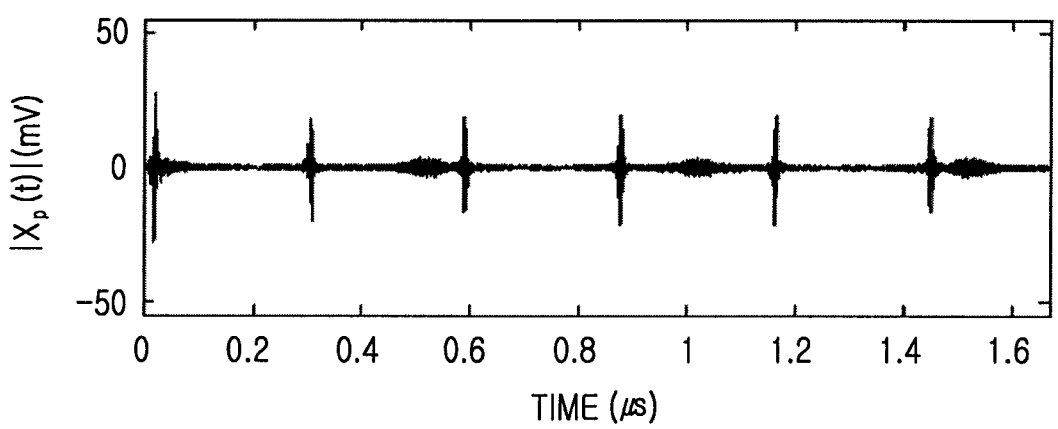

FIG. 2A is a schematic block diagram illustrating a digital broadcasting apparatus according to an exemplary embodiment of the present invention, FIG. 2B is a detail block diagram illustrating a digital broadcasting apparatus according to an exemplary embodiment of the present invention, FIGS. 2C and 2D illustrate characteristics of a peak spectrum limiter according to an exemplary embodiment of the present invention, and FIGS. 2E and 2F illustrate digital broadcast signals processed by a digital broadcasting apparatus according to an exemplary embodiment of the present invention.

Referring to FIG. 2A, the digital broadcasting apparatus includes a SAW filter 10, a Low Noise Amplifier (LNA) 20, a peak spectrum limiter 30, a notch filter 40B, a Band Pass Filter (BPF) 50 and a tuner 60. The SAW filter 10, the LNA 20, the BPF 50, and the tuner 60 illustrated in FIG. 2A are substantially the same as those of the conventional digital broadcasting apparatus. The peak spectrum limiter 30 and the notch filter 40B of the digital broadcasting apparatus according to an exemplary embodiment of the present invention are different from the conventional digital broadcasting apparatus illustrated in FIG. 1A. In the digital broadcasting apparatus according to an exemplary embodiment of the present invention, the peak spectrum limiter 30 minimizes the influence of a GSM signal, which is adjacent to a digital broadcast signal and has greater power, by limiting a signal spectrum peak value to a peak value of the digital broadcast signal (e.g., amplitude) at the input of the notch filter 40B. Thus, the notch filter 40B according to an exemplary embodiment of the present invention does not need a complex filter configuration for minimizing a GSM signal which is adjacent to a digital broadcast signal and has greater power (e.g., an order of the filter can be decreased). Therefore, the notch filter 40B can be implemented with a simpler filter configuration than the conventional notch filter 40A.

Referring to FIGS. 2B to 2D, FIG. 2B illustrates that the peak spectrum limiter 30 illustrated in FIG. 2A can be implemented with BPFs 30A and 30B and a circuit 30C for obtaining a difference between two signals. As illustrated in FIG. 2C, a frequency band of the BPF 30A includes a frequency band of a desired signal (e.g., a Ultra High Frequency (UHF) band of a digital broadcast signal) and a frequency band of an undesired signal (e.g., a GSM frequency band). As illustrated in FIG. 2D, a frequency band of the BPF 30B includes a frequency band of an undesired signal (e.g., an interference signal). The circuit 30C for obtaining a difference between two signals limits an unnecessary noise signal (e.g., a GSM signal) to a constant level by adding two signals input from the BPFs 30A and 30B and acquiring a signal having a difference between the two signals (e.g., a digital broadcast signal).

Referring to FIGS. 2E and 2F, the digital broadcasting apparatus according to an exemplary embodiment of the present invention generates an exemplary spectrum and waveform as illustrated in FIGS. 2E and 2F by processing a digital broadcast signal using the SAW filter 10, the LNA 20 and the peak spectrum limiter 30. Thus, the digital broadcast signal processed as illustrated in FIG. 2E has better signal characteristics than the characteristics (illustrated in FIGS. 1B and 1C) of the digital broadcast signal processed by the conventional digital broadcasting apparatus. That is, FIGS. 2E and 2F illustrate a spectrum and waveform of a clipped undesired signal obtained by limiting the amplitude (signal intensity) of an interference signal (a GSM signal) to the amplitude of the digital broadcast signal (desired signal). Thereafter, the digital broadcasting apparatus according to an exemplary embodiment of the present invention acquires a digital broadcast signal with a suppressed undesired signal using the notch filter 40B. Then, the digital broadcast signal processed by the notch filter 40B is passed through the BPF 50 and the tuner 60.

Figure 3:
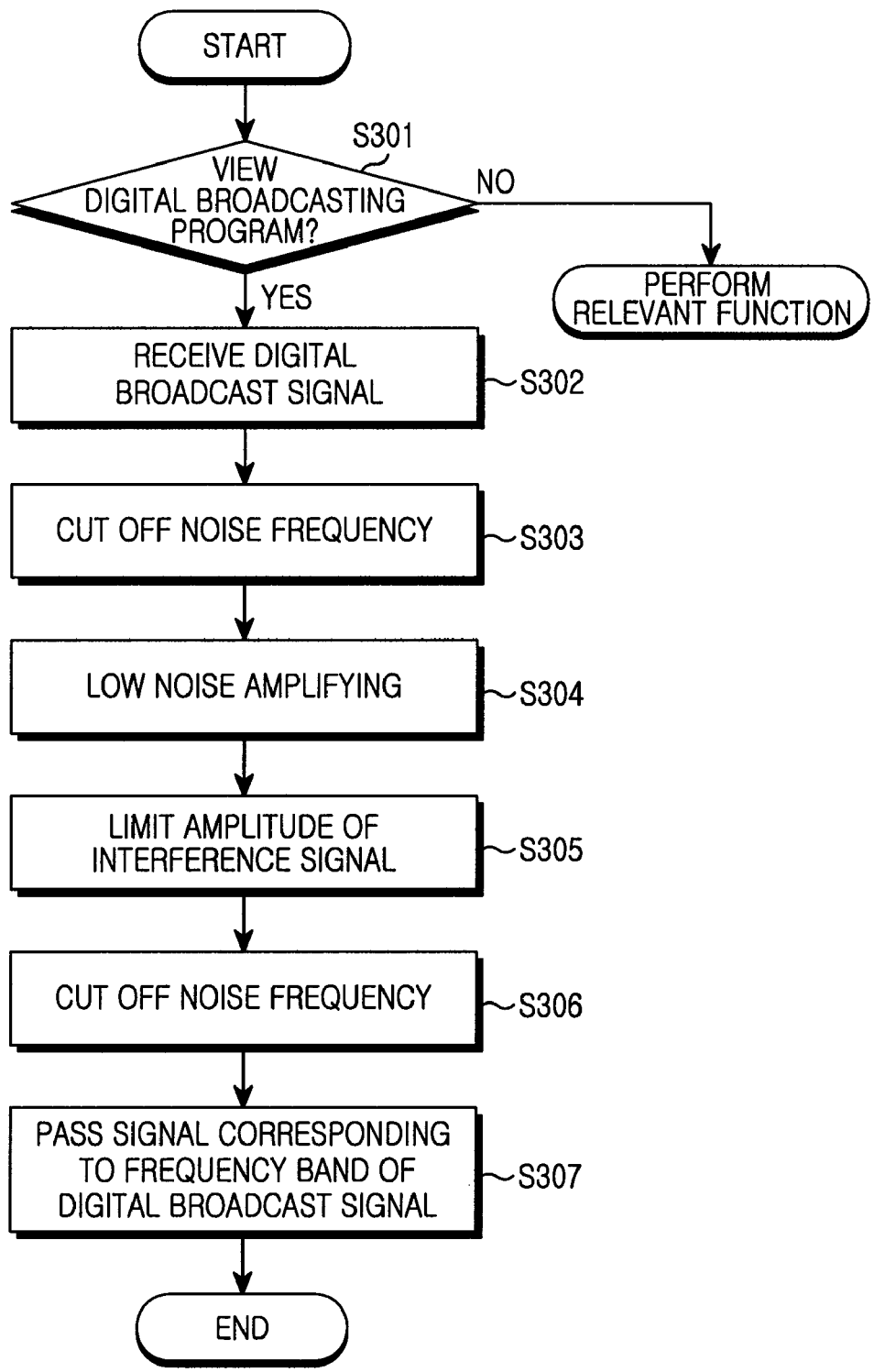
FIG. 3 is a flowchart illustrating a signal processing process of a digital broadcasting apparatus according to an exemplary embodiment of the present invention.

FIG. 3 is a flowchart illustrating a signal processing method of a digital broadcasting apparatus according to an exemplary embodiment of the present invention. The digital broadcasting apparatus according to an exemplary embodiment of the present invention, which was described with reference to FIGS. 2A to 2F, will now be described with reference to FIG. 3. For ease of explanation and as an example only, a digital broadcast signal having the UHF band (470 MHz-862 MHz) of DVB-H is used.

Referring to FIG. 3, a determination is made as to whether a digital broadcasting view request is input in step S301. If it is determined that a request is input in step S301, a digital broadcast signal is received by the digital broadcasting apparatus in step S302. In step S303, the signal is filtered by a SAW filter and in step S304, the digital broadcast signal is low-noise amplified.

Steps S301 to S304 are substantially the same steps as performed by the conventional digital broadcasting apparatus and characteristics of the digital broadcast signal are illustrated in FIGS. 1B and 1C.

The peak spectrum of the digital broadcast signal, which has been low-noise amplified in step S304, is limited in order to minimize the undesired noise strength (e.g. noise from a GSM signal) to the certain level in step S305. In step S306, the noise signal is further suppressed by a notch filter.

As illustrated in FIGS. 1B and 1C, after exemplary steps S301 to S304 are performed, a processed digital broadcast signal still has the relatively greater power interference signal (undesired signal, GSM signal). However, according to an exemplary embodiment, the peak spectrum limiter 30 minimizes the influence of the interference signal by limiting the amplitude of the interference signal spectrum in step S305. Thus, the frequency spectrum and waveform of the digital broadcast signal in which the amplitude of the interference signal is limited in step S305 are illustrated in FIGS. 2E and 2F. As illustrated in FIGS. 2E and 2F, if the influence of the interference signal on the digital broadcast signal is minimized at the input of the notch filter, the notch filter for processing an interference signal (i.e., a noise frequency) of the digital broadcast signal can be simply implemented. Thus, the peak spectrum limiter 30 according to an exemplary embodiment of the present invention decreases the complexity of a notch filter (e.g., the notch filter may be implemented at a lower order) and minimizes an interference signal component as compared to the prior art.

Substantially only a frequency band of the digital broadcast signal is passed from the notch-filtered signal in step S307.

The digital broadcast signal from which the influence of the interference signal has been minimized is processed by the BPF 50 and the tuner 60, and finally a digital broadcast signal having good quality can be provided to a user.

Although DVB-H and GSM have been illustrated, the present invention can be applied to other communication fields in which frequency bands are adjacent to each other and signal distortion exists due to relatively greater power noise.

As described above, according to exemplary embodiments of the present invention, distortion of a DVB-H broadcast signal due to interference of a GSM signal can be minimized.

In addition, the configuration of a notch filter of a digital broadcasting apparatus is simplified.

In addition, besides a digital broadcast signal, when frequency bands of two communication signals are adjacent to each other, signal distortion due to relatively greater power noise can be minimized.

While the invention has been shown and described with reference to a certain exemplary embodiments thereof, it will be understood by those skilled in the art that various changes in form and details may be made therein without departing from the spirit and scope of the invention as defined by the appended claims and their equivalents.

What is claimed is:

1. A signal processing apparatus comprising:
    a Surface Acoustic Wave (SAW) filter for cutting off a noise frequency of a received signal;
    a Low Noise Amplifier (LNA) for low-noise amplifying the SAW-filtered signal;
    a peak spectrum limiter for limiting an amplitude of an interference signal against the signal with respect to an amplitude of the low-noise amplified SAW-filtered signal;
    a notch filter for cutting off a noise frequency of the signal in which the amplitude of the interference signal is limited; and
    a Band Pass Filter (BPF) for passing a signal corresponding to a frequency band of the signal from the notch-filtered signal.

2. The signal processing apparatus of claim 1, wherein the signal comprises a digital broadcast signal.

3. The signal processing apparatus of claim 2, wherein the interference signal comprises a Global System for Mobile Communications (GSM) signal.

4. The signal processing apparatus of claim 2, wherein the peak spectrum limiter comprises:
    a first BPF for passing both the digital broadcast signal and the interference signal;
    a second BPF for passing only the interference signal; and
    a circuit for obtaining a difference between a signal input from the first BPF and a signal input from the second BPF and for limiting the amplitude of the interference signal to the amplitude of the digital broadcast signal.

5. The signal processing apparatus of claim 2, further comprising a tuner for tuning a frequency signal corresponding to a digital broadcasting program selected by a user from the band-pass-filtered signal.

6. A wireless terminal including a signal processing apparatus, the signal processing apparatus comprising:
    a Surface Acoustic Wave (SAW) filter for cutting off a noise frequency of a received signal;
    a Low Noise Amplifier (LNA) for low-noise amplifying the SAW-filtered signal;
    a peak spectrum limiter for limiting an amplitude of an interference signal against the signal with respect to an amplitude of the low-noise amplified SAW-filtered signal;
    a notch filter for cutting off a noise frequency of the signal in which the amplitude of the interference signal is limited; and
    a Band Pass Filter (BPF) for passing a signal corresponding to a frequency band of the signal from the notch-filtered signal.

7. The wireless terminal of claim 6, wherein the signal comprises a digital broadcast signal.

8. A signal processing method comprising:
    cutting off a noise frequency of a received signal and low-noise amplifying the noise frequency cut-off signal;

limiting an amplitude of an interference signal against the signal with respect to the low-noise amplified signal; and cutting off a noise frequency of the signal in which the amplitude of the interference signal is limited, and passing a signal corresponding to a frequency band of the signal.

9. The signal processing method of claim 8, wherein the signal comprises a digital broadcast signal.

10. The signal processing method of claim 9, wherein the interference signal comprises a Global System for Mobile Communications (GSM) signal.

11. The signal processing method of claim 9, wherein the limiting of the amplitude comprises:

a first filtering comprising passing both the digital broadcast signal and the interference signal;

a second filtering comprising passing only the interference signal; and obtaining a difference between two signals input from the first filtering and the second filtering and limiting the amplitude of the interference signal to the amplitude of the digital broadcast signal.

12. The signal processing method of claim 9, further comprising tuning a frequency signal corresponding to a digital broadcasting program selected by a user from the band-pass-filtered signal.

* * * * *